United States Patent [19]

Miyauchi et al.

[11] Patent Number: 5,745,215

[45] Date of Patent: Apr. 28, 1998

[54] MONITOR SYSTEM FOR IMAGE PRINTER

[75] Inventors: Mitsuru Miyauchi; Shoji Nishibayashi, both of Wakayama, Japan

[73] Assignee: Noritsu Koki Co., Ltd., Wakayama-ken, Japan

[21] Appl. No.: 587,861

[22] Filed: Jan. 11, 1996

Related U.S. Application Data

[63] Continuation of Ser. No. 257,767, Jun. 9, 1994, abandoned.

[30] Foreign Application Priority Data

Jun. 15, 1993 [JP] Japan .................................. 5-143849

[51] Int. Cl.$^6$ ........................... G03B 27/52; H04N 1/46
[52] U.S. Cl. .............................. 355/38; 355/35; 355/67

[56] References Cited

U.S. PATENT DOCUMENTS

| | | | |
|---|---|---|---|
| 4,174,173 | 11/1979 | Pone, Jr. .................. | 355/38 |
| 4,710,019 | 12/1987 | Terashita ................... | 355/38 |
| 4,736,244 | 4/1988 | Shiota et al. ............... | 358/76 |
| 4,991,004 | 2/1991 | Hayashi et al. ............. | 358/76 |
| 5,063,407 | 11/1991 | Takagi ...................... | 355/68 |
| 5,119,126 | 6/1992 | Tokuda ..................... | 355/41 |
| 5,267,030 | 11/1993 | Giorgianni et al. ......... | 358/527 |
| 5,357,315 | 10/1994 | Suzuki ...................... | 355/77 |

FOREIGN PATENT DOCUMENTS

| | | |
|---|---|---|
| 61-138943 | 6/1986 | Japan . |
| 1-149039 | 6/1989 | Japan . |
| 1-200348 | 8/1989 | Japan . |

*Primary Examiner*—Daniel P. Malley
*Attorney, Agent, or Firm*—Townsend and Townsend and Crew LLP

[57] ABSTRACT

A monitor adjusting system facilitates image adjusting procedures such as color or density correction. Prior to printing an image onto photosensitive paper, the exposure settings are selected so that the printed image on the print paper will have proper colors and densities. Initial adjustments are made to the exposure setting based on the actual images being developed. To check the correctness of the changes in exposure setting for the actual images, the operator inserts a color calibration (reference) film strip which is read and displayed by the system. The film strip will display two images: (1) a reference scene of a human subject or a landscape and (2) either a density chart or a color chart. The images are used as indicators of the correctness of the adjustments made. Using the color chart separates out the effects of exposure on individual colors, while the landscape or human image simultaneously displays the effected exposure settings on a great number of color components in a complicated mixed pattern. This provides two sets and types of indicators to facilitate the correction of exposure to the point that even inexperienced operators can make corrections with relative ease.

4 Claims, 4 Drawing Sheets

MONITOR SYSTEM FOR IMAGE PRINTER

This is a Continuation of application Ser. No. 08/257,767, filed Jun. 9, 1994, now abandoned.

BACKGROUND OF THE INVENTION

1. Field of the Invention

The present invention relates to a monitor system for an image printer.

2. Description of the Related Art

A monitor system for an image printer is intended for allowing appropriate correction of various exposure conditions by causing image display means such as a CRT to display predictable result of exposure before the exposure of color image information of a film is effected by exposure means. For the appropriate correction of the exposure conditions, the correction is made so that the image displayed by the image display means may be identical to the resultant image exposed by the exposure means.

More specifically, supposing a monitor mode is instructed by mode instructing means; then, after color image information of a film is read by reader means, exposure condition calculating means for obtaining exposure conditions proceeds to obtain exposure conditions based on the read image information and exposure condition calculation information. Then, image information correcting means produces exposure-conditioned image information based on the read image information and the exposure conditions. Next, display control means produces display image information based on the exposure-conditioned image information and image display calculation information and causes image display means to display the display image information as a color image.

Accordingly, by viewing the color image displayed on the image display means, an operator may judge whether an appropriate exposure is possible or not. If it is judged that the exposure will be inappropriate; then, correction information for correcting color or density will be inputted to exposure correcting information input means such as a keyboard device to correct the exposure condition calculation information. Incidentally, in general, when the exposure condition calculation information is corrected; then, based on this correction, display image information is reproduced to be displayed on the image display means to allow the operator to confirm also the appropriateness of the correction of the exposure condition calculation information.

In case the monitor system is integrated with the image printer, the exposure conditions obtained by the exposure condition calculating means are directly outputted to the exposure means to be used thereby for the exposure operation.

On the other hand, in case the monitor system is provided separately from the image printer, the exposure conditions obtained by the exposure condition calculating means are once stored at a storage medium such as a floppy disc, and then, the exposure conditions are provided through this storage medium to the exposure means (see, for example, Japanese laid-open patent gazette Hei. 1-149039, Japanese laid-open patent gazette Hei. 1-200348).

In case the mode instructing means instructs a correction mode; then, after the reader means reads a correction film recording a reference image generally of a human subject, a landscape or the like, like the above-described monitor mode, a color image of the reference image is displayed on the image display means.

Therefore, by viewing this color image displayed on the image display means, the operator may judge whether the display conditions of the image display means are appropriate or not. If it is judged that the conditions are inappropriate; then, correction information for correcting color or density will be inputted to display correcting information input means such as a keyboard device to correct the image display calculation information. Incidentally, in this mode too, generally, when the image display calculation information is corrected; then, based on this correction, display image information is reproduced to be displayed as a color image on the image display means to allow the operator to confirm also the appropriateness of the correction of the image display calculation information.

Further, for the judgment of the display conditions of the image display means, there is generally used a reference print produced by exposing the correction film on to a printing paper under proper exposure conditions.

According to the above-described conventional art, the operator is to effect correction of a color, density or the like while viewing the color image displayed on the image display means which color image corresponds to the reference image of a human subject, a landscape or the like. However, this color image corresponds to the reference image of a human subject, a landscape or the like including a number of colors in a mixed state. Hence, even if the operator comes to notice inappropriateness of the color balance, the operator, if inexperienced, will find it difficult to determine which of the many colors is inappropriate. As a result, the correction operation becomes difficult and troublesome. In this respect, improvement has been desired.

Incidentally, as disclosed in e.g. Japanese laid-open patent gazette Sho. 61-138943, the prior art has suggested also an alternative in which the image display means is caused to display, beside the color image corresponding to the reference image of a human subject, a landscape or the like, a further color image corresponding to a gray step image comprised of gradation of a predetermined density difference. In this case too; however, even if the operator notices inappropriate color balance, he/she will find it difficult to realize, by viewing the gray step image alone, what specific adjustment is to be made in order to obtain appropriate color balance. Thus, the correction operation can not be effected in an efficient manner.

The present invention attends to the above-described state of the art. A primary object of the present invention is to solve the above-described problems of the prior art thereby to make it possible to effect the correction operation with higher efficiency.

SUMMARY OF THE INVENTION

For accomplishing the above-noted object, a monitor system for an image printer, according to the present invention, comprises:

reader means for reading color image information of a film to be exposed on to a photosensitive material, with dividing the color image information into a plurality of areas;

read image information storing means for storing the read image information;

exposure condition calculating means for obtaining exposure conditions of the exposure means based on the read image information of the read image information storing means and exposure condition calculation information;

image information correcting means for correcting the read image information based on the exposure conditions to produce exposure-conditioned image information;

display control means for producing display image information based on the exposure-conditioned image information and image display calculation information and causing image display means to display the display image information as a color image;

exposure correction information input means for inputting correction information for correcting the exposure condition calculation information;

display correction information input means for inputting correction information for correcting the image display calculation information; and mode instructing means for instructing a switch-over between a monitor mode for correcting the exposure condition calculation information with an input from the exposure correction information input means and a correction mode for correcting the image display calculation information with an input from the display correction information input means;

wherein, when said mode instructing means instructs the correction mode, said display control means produces said display image information corresponding to image information read by said reader means and concerning a color correction film recording a color chart image including a plurality of color components distributed separately in a plurality of areas and then causes the image display means to display said display image information;

said image display information being corrected based on said correction information inputted from said display correction information input means and concerning a color to be corrected and correction contents, said image display means being caused to display said display image information produced by said corrected image display calculation information.

According to the above-described construction, in the correction mode, by causing the reader means to read the color correction information recording a color chart image including a plurality of color components distributed separately in a plurality of areas, a color image corresponding to this color chart image is displayed on the image display means.

Therefore an operator, as viewing the color image corresponding to the color chart image, may make an appropriate judgment separately on each of the plurality of colors. Then, if there is displayed any inappropriate color; then, for this color as a correction target color, its correction contents (e.g. hue, chroma or the like) are inputted from the display correction information input means.

In accordance with this input from the display correction information input means, the image display calculation information is corrected, and a color image of the display image information produced from the corrected image display calculation information, i.e. a color image corresponding to the corrected color chart image is displayed on the image information display means.

Therefore, an operator may judge appropriateness of the correction by viewing the color image corresponding to the color chart image and displayed after the correction. Needless to say, if a further correction is needed, the color to be corrected and its correction contents are inputted to the display correction information input means so as to obtain appropriate display condition.

As a result, an operator may correct the display condition through correction of the image display calculation information while viewing the color image corresponding to the color chart image displayed on the image information display means, confirming which color of the many colors is displayed inappropriately and confirming also the result of the correction. Hence, even an inexperienced operator may speedily effect a color balance correcting operation.

According to one aspect of the present invention, when said mode instructing means instructs the correction mode, based on said image information read by said reader means concerning said color correction film and on further image information read by said reader means concerning an auxiliary correction film recording a reference image, said display control means produces said display image information for causing said image display means to display said color chart image and said reference image in juxtaposition to each other.

With this construction, the reader means is caused to read, in addition to the color correction film, an auxiliary correction film recording a reference image of a human subject, a landscape or the like. Then, the display image information for causing the color reference image and the reference image to be displayed in juxtaposition to each other is produced and then displayed on the image display means. Needless to say, in accordance with the input of the display correction information input means, the image display calculation information is corrected. Then, the color images of the display image information produced from the corrected image display calculation information, i.e. the color images corresponding to the corrected color chart image and reference image are displayed on the image information display means.

Accordingly, by viewing the color image corresponding to the color chart image and the color image corresponding to the reference image which images are displayed after the correction, the operator may judge appropriateness of correction more reliably with the possibility of confirmation of consequence of the correction on the color image corresponding to the reference image.

As described above, the color image corresponding to the reference image of a human subject, a landscape or the like is displayed in juxtaposition to the color image corresponding to the color chart image; and the correcting operation may be effected with confirmation of consequence of the correction on the color image. As a result, the correction may be made with appropriate display of such a particularly important color as the skin color.

According to a still further aspect of the invention, the image display means is adapted to display actual information corresponding to a color needing correction and correction content information inputted from the display correction information input means.

With the above construction, the actual information inputted from the display correction information input means and corresponding to a color needing correction, such as measurement values of hue, chroma or the like obtained from the image information read by the reader means and the correction content information such as correction amounts of hue, chroma or the like are displayed. Accordingly, the operator may effect the correcting operation with quantitative confirmation of the correction contents.

As a result, with the possibility of effecting the correcting operation with the quantitative confirmation of the correction contents, the operator may readily input the correction content of an appropriate amount. Whereby, the correcting operation may be effected even more efficiently.

According to a still further aspect of the present invention, said mode instructing means selectively provides an instruction for either a color correction mode or a density correction mode, as said correction mode; and when the mode instructing means instructs the density correction mode, from image information read by said reader means and concerning a density correction film recording a density image corresponding to a standard density and the further image information read by said reader means and concerning said auxiliary correction film recording said reference image, said display control means produces said display image information for causing said image display means to display said density image and said reference image in juxtaposition to each other, said image display information being corrected based on said density correction information inputted from said display correction information input means, said image display means being caused to display said display image information produced by said corrected image display calculation information.

According to the above construction, for a color balance correcting operation, the color correction mode is instructed, whereby displays of many colors may be corrected.

On the other hand, for a density correcting operation, the reader means is caused to read the density correction film recording a density image corresponding to the standard density and the auxiliary correction film recording a reference image of a human subject, a landscape or the like. Then, the display image information for displaying the density image and the reference image in juxtaposition to each other is generated and displayed on the image display means. Needless to say, in association with the input from the display correction information input means, the image display calculation information is corrected; then, the color image of the display image information produced from the corrected image display calculation information, namely, the corrected density image and the color image corresponding to the reference image are displayed by the image information display means.

Accordingly, by viewing the color image corresponding to the density image and also the color image corresponding to the reference image which images are displayed after the correction, the operator may judge appropriateness of density correction more reliably with the possibility of confirmation of consequence of the correction on the color image corresponding to the reference image.

As described above, the color image corresponding to the reference image of a human subject, a landscape or the like is displayed in juxtaposition to the color image corresponding to the density image; and the correcting operation may be effected with confirmation of consequence of the correction on the color image. As a result, in comparison with a further construction in which only the color image corresponding to the density image is display, a correcting operation for obtaining display of appropriate density may be effected speedily.

Further and other objects, features and effects of the invention will become apparent from the following more detailed description of the embodiments of the invention with reference to the accompanying drawings.

DESCRIPTION OF THE PREFERRED EMBODIMENTS

Preferred embodiments of a monitor system for an image printer relating to the present invention will now be described in details with reference to the accompanying drawings.

Figure 1:
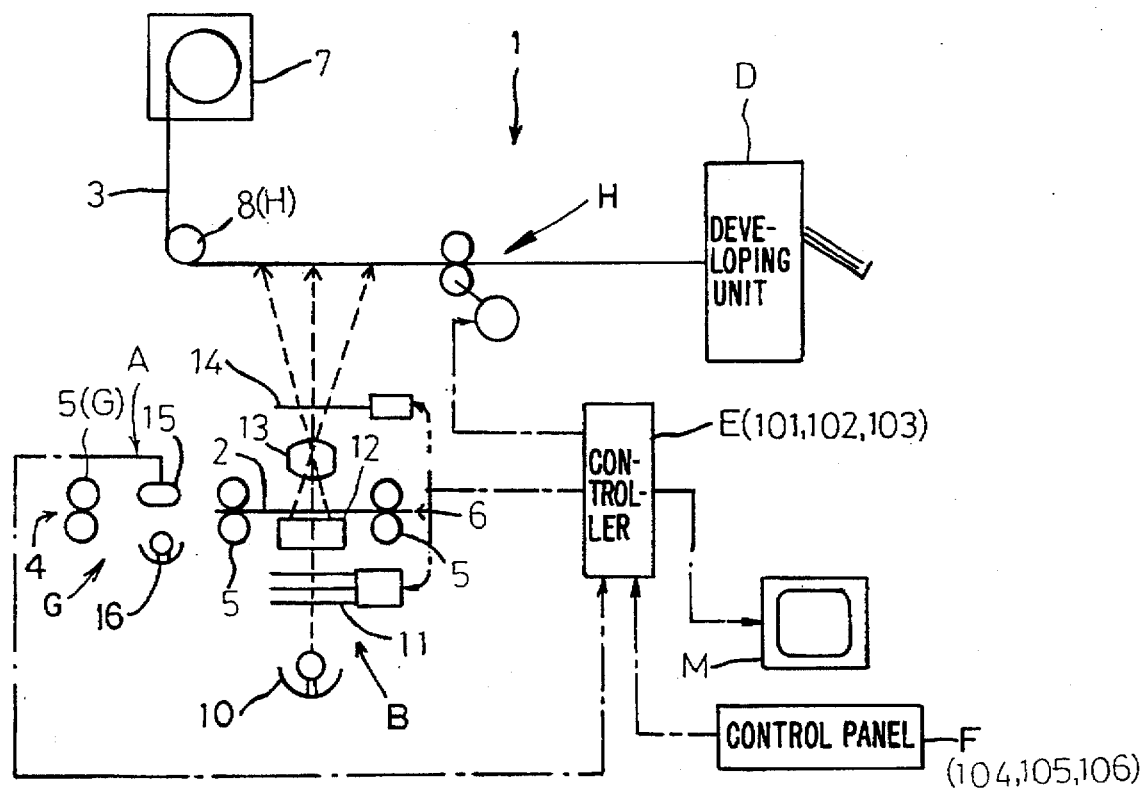
FIG. 1 is a construction view of an image printer including a monitor system according to one preferred embodiment of the present invention.

As shown in FIG. 1, an image printer 1 equipped with a monitor system includes, as main components thereof, a reader means A for reading image information of a film 2 (negative film), an exposure means B for projecting and exposing the image information of the film 2 on to a printing paper 3 as a photosensitive material, a developing unit D for developing the exposed printing paper 3, a controller E for controlling operations of the respective components of this image printer 1, a control panel F for inputting various kinds of information to the controller E, and a monitor device M comprised of e.g. a CRT and acting as image display means for displaying, as a color image, display image information produced from the image information read by the reader means A.

The film 2, when charged from an insert portion 4, is transported by a film transport means G including rollers 5 and so on through the reader means A for reading image information thereof to the exposure means B. With completion of exposure, the film 2 is discharged from a discharging unit 6.

The printing paper 3 is stored in a rolled state within a printing-paper holder 7. Then, the printing paper 3 is withdrawn from the printing-paper holder 7 by printing-paper transport means H including e.g. a transporter roller 8 and then is subjected to an exposure by the exposure means B. Then, the printing paper 3 is developed at the developing unit D and then cut into a piece containing one-frame amount of image information to be consequently discharged from the printer.

The exposure means B includes a projection exposure light source 10, a light modulating filter 11 for adjusting a color balance of light beam to be irradiated on to the film 2, a mirror tunnel 12 for uniforming mixing the color components of the light passing through the light modulating filter 11, a printing lens 13 for forming an image of the film 2 on the printing paper 3, and a shutter 14, with all these members being aligned along a common optical path.

In operation, based on the image information of the film 2 read by the reader means A, the controller E controls the light modulating filter 11 to adjust the irradiation light of the projection exposure light source 10 to a color balance according to color densities of the image of the film 2. Then, as the film 2 is irradiated with this adjusted light, the image of the film 2 is printed on to the printing paper 3.

The reader means A includes, as a main component thereof, an image sensor 15 for reading the color image information of the film 2 with dividing the information into a plurality of areas. And, as a white light is irradiated on to the film 2 from the light source 16, the image sensor 15 reads intensities of its transmission light with dividing the light into the three primary color components of red, green and blue.

The developing unit D, though not shown, includes a plurality of tanks filled with processing liquids for developing the exposed printing paper 3. Then, the printing paper 3 is developed through its successive passage through these tanks.

Figure 2:
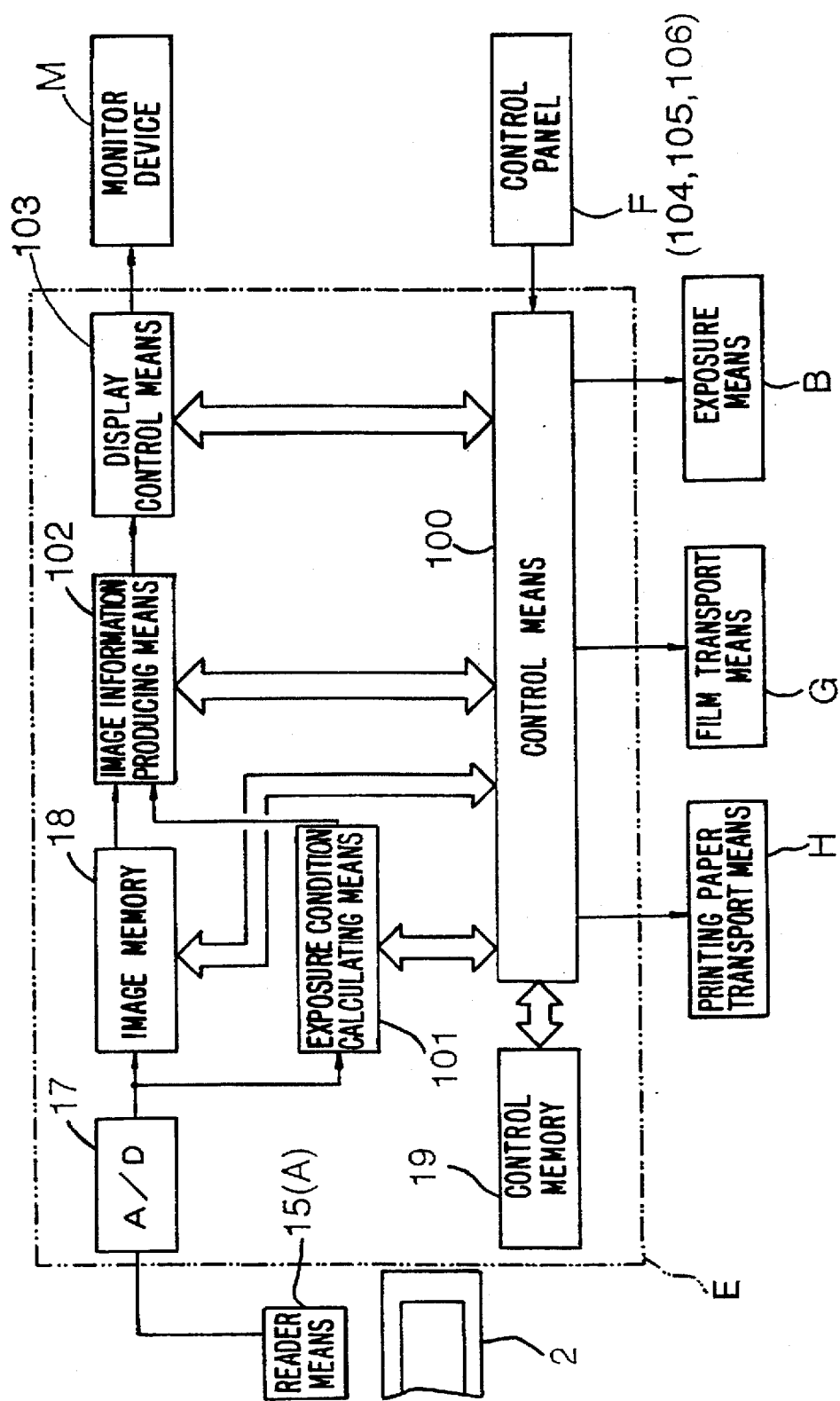
FIG. 2 is a block diagram showing a control construction.

The controller E, as shown in FIG. 2, a converter 17 for effecting A/D conversion of the image information read by the image sensor 15 of the reader means A, an image memory 18 acting as read image information storing means for storing the digital image information from the converter 17, a control memory 19 for storing control information, a control means 100 for controlling the overall operations of the printer based on information inputted from the control panel F or information stored at the control memory 19, an exposure condition calculating means 101 for obtaining exposure conditions of the exposure means B for each frame of the film 2 based on the digital image information from the converter 17 and exposure condition calculation information, an image information producing means 102 for correcting the digital image information from the converter 17 based on the obtained exposure conditions thereby to produce exposure-conditioned image information, and a display control means 103 for producing display image information based on the exposure-conditioned image information and image display calculation information and causing the monitor device M to display the display image information as a color image.

Then, the control panel F functions as an exposure correction information input means 104 for inputting information for correcting the exposure condition calculation information, a display correction information input means 106 for inputting information for correcting the image display calculation information, and also as a mode instructing means 106 for instructing a switch-over between a monitor mode and a correction mode.

More specifically, when the monitor mode is instructed, the image printer 1 operates as follows.

With charging of the film 2, this film 2 is transported by the film transport means G through the reader means A to the exposure means B. In association with this transportation of the film 2, the reader means A reads color image information of the film 2. Based on this read image information and exposure condition calculation information, the exposure condition calculating means 101 obtains exposure conditions of the exposure means B. Then, based on these obtained exposure conditions, the image information correcting means 102 corrects the read image information thereby to produce exposure-conditioned image information. Based on the exposure-conditioned image information and image display calculation information, the display control means 103 produces display image information to be displayed on the monitor device M as a color image.

Figure 3:
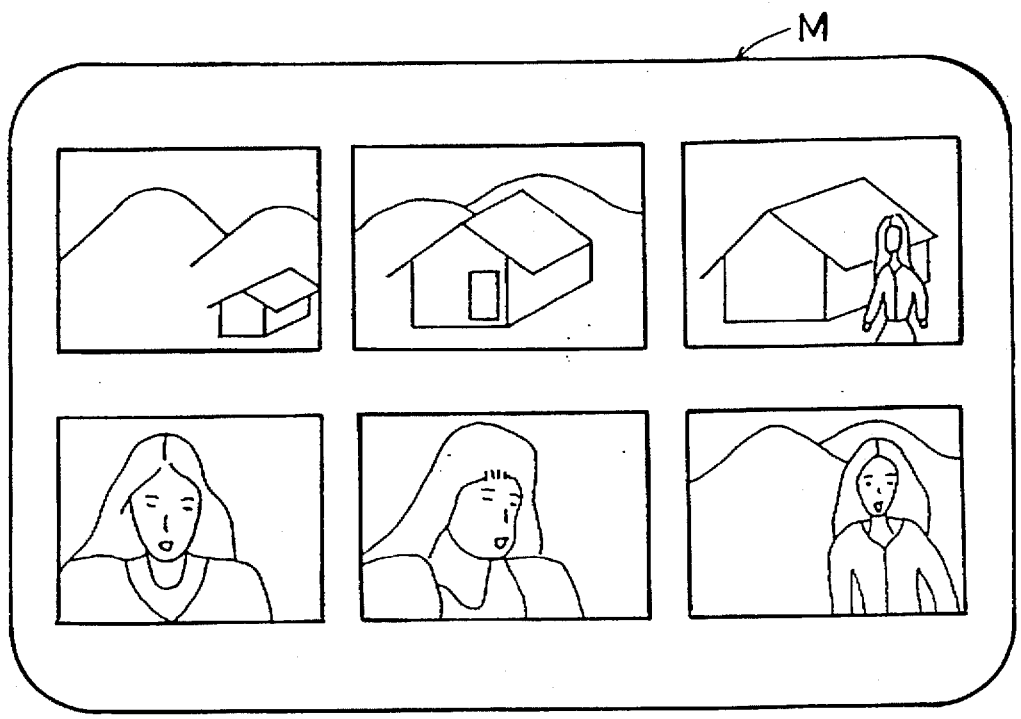
FIG. 3 is a view showing a monitor display condition in a monitor mode.

This display on the monitor device M is effected in a manner illustrated for instance in FIG. 3, where six frames of the film 2 are displayed together at one time.

Accordingly, by viewing the color images displayed on the monitor device M, an operator may judge whether each of the six frames will be appropriately exposed or not. If there is found any frame which is to be inappropriately exposed, this frame is designated by the control panel F and correction information for correcting a color, density or the like of this frame is inputted from the control panel F.

With the above input of the correction information for the frame to be exposed inappropriately, based on this information, the exposure condition calculation information is corrected. Then, with this correction of the exposure condition calculation information, new display image information is produced from the corrected exposure condition calculation information to be displayed as a color image on the monitor device M.

When the operator completes the inputting operation of the correction information for the particular one of the six frames and then inputs this completion to the control panel F, color images of new six frames are displayed on the monitor device M. Then on, an input operation of correction information for these new six frames is effected. Simultaneously therewith, the exposure means B effects projection exposure of each frame with the exposure conditions obtained for each frame by the exposure condition calculating means 101.

Incidentally, needless to say, the film transport means G and the printing-paper transport means H too are operated in association with the above-described exposure operation. Further, the exposure condition calculation information prior to the correction comprises calculation information prepared for obtaining exposure conditions for appropriately exposing the image of the film 2 on to the printing paper 3. As this information, various known types of information may be employed. Also, the image display calculation information includes e.g. information used for converting a negative image into a positive image, or information for correcting the image information so as to match the image forming capability of the printing paper 3 with the displaying capability of the monitor device M. As this information too, various known types of information may be employed.

Next, the correction mode of the image printer 1 will be described.

As this correction mode, there are provided a color correction mode and a density correction mode. The selection between these modes is possible by an input from the control panel F.

Figure 4:
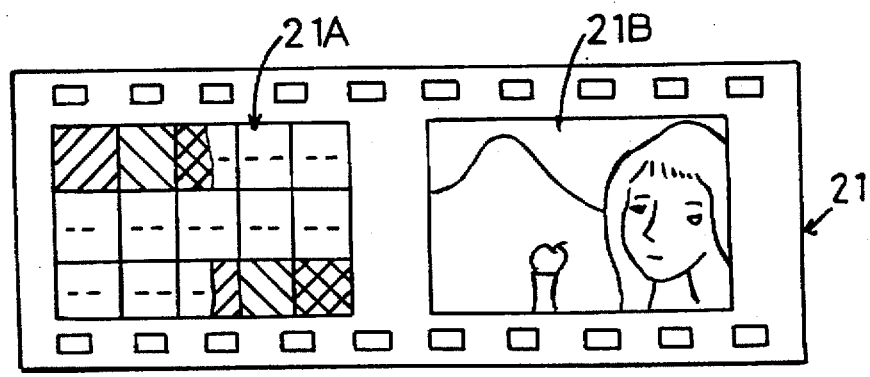
FIG. 4 is a plane view of a first correction film.
Figure 6:
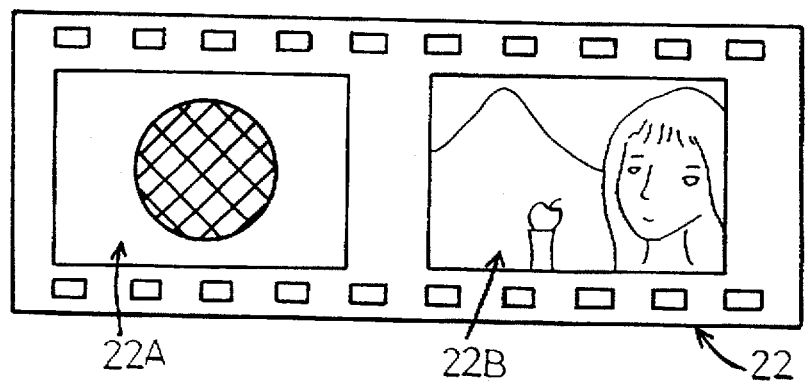
FIG. 6 is a plane view of a second correction film.

For the purpose of color correction, there is prepared a first correction film 21 as shown in FIG. 4. For the purpose of density correction, there is prepared a second correction film 22 as shown in FIG. 6.

The first correction film 21 comprises a color correction film 21A recording a color chart having a plurality of colors separately distributed in a plurality of areas and an auxiliary correction film 21B recording a reference image of a human subject, a landscape or the like, with the two films 21A, 21B being combined into a single film. Incidentally, as the plurality of colors of the color correction film 21A, in the instant embodiment, there are employed fifteen colors including blue, green, red, yellow, magenta, cyanogen, deep green, reddish purple, reddish green and so on. And, these colors are recorded side by side on the color correction film 21A.

The second correction film 22 comprises a density correction film 22A recording a density image in the form of a circle corresponding to a standard density and an auxiliary correction film 22B recording a reference image of a human subject, a landscape or the like, with the two films 22A, 22B being combined into a single film.

With the instruction for the color correction mode, the image printer 1 functions as follows.

With charging of the first correction film 21 from the inserting portion 4, the film transport means G transports this first correction film 21 through the reader means A and the exposure means B to the discharging unit 6.

Figure 5:
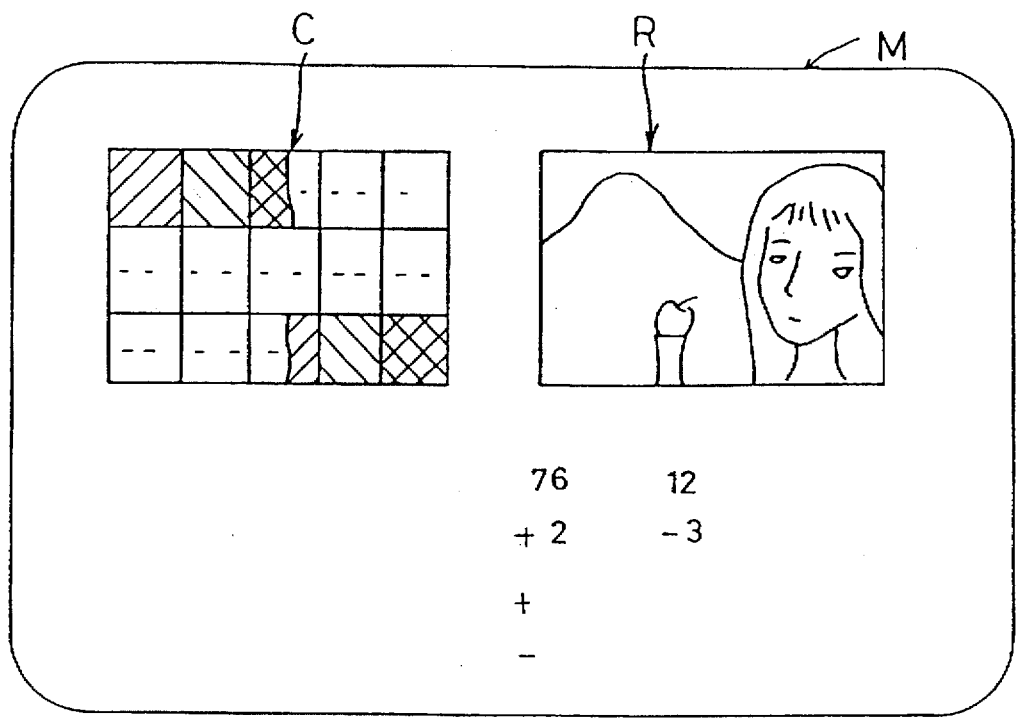
FIG. 5 is a view showing a monitor display condition corresponding to the first correction film.

In association with the above transportation of the first correction film 21, the reader means A reads the color image information of the first correction film 21 and stores this read image information at the image memory 18. Based on this read image information and exposure condition calculation information, the exposure condition calculating means 101 obtains exposure conditions of the exposure means B. Then, based on the obtained exposure conditions, the image information correcting means 102 corrects the read image information thereby to produce exposure-conditioned image information. Based on the exposure-conditioned image information and image display calculation information, the display control means 103 produces display image information for causing the monitor device M to display, as color images, the color chart image C and the reference image R in juxtaposition to each other as illustrated in FIG. 5.

Accordingly, in viewing the color image corresponding to the color chart image C, the operator may judge appropriateness of each of the plurality of colors. Then, if any color is displayed inappropriately, this color is designated as correction-target color, and its correction contents (hue, chroma) are inputted from the control panel F.

With this input from the control panel F, the image display calculation information is corrected. And, from this corrected image display calculation information, display image information is again produced. Then, a color image corresponding to this display image information, i.e. the corrected color chart image C and the color image corresponding to the reference image R are displayed on the monitor device M.

Accordingly, by viewing the color image displayed after the correction and corresponding to the color chart, the operator may judge appropriateness of the correction. Further, by viewing the color image displayed after the correction and correspondig to the reference image R, the operator may more reliably judge the appropriateness of the correction with the further possibility of confirmation of how the correction influences the color image corresponding to the reference image R. Needless to say, if a further correction is needed, an appropriate display condition may be obtained by inputting the color needing the further correction and its correction contents to the control panel F.

Further, as shown in FIG. 5, actual information (in this embodiment, measurement values of hue, chroma or the like obtained from the information read by the reader means A) inputted from the control panel F and concerning the color needing correction and correction content information (correction amounts of hue, chroma or the like in this embodiment) together with a direction of correction of hue are displayed.

Thus, the operator may effect the correcting operation with quantitative confirmation of the correction contents.

When the density correction mode is instructed, the image printer 1 operates basically in the same manner as the case of the color correction mode.

With charging of the second correction film 22 from the inserting portion 4, the film transport means G transports this second correction film 22 through the reader means A and the exposure means B to the discharging unit 6.

In association with the above transportation of the second correction film 22, the reader means A reads the color image information of the second correction film 22. Based on this read image information and exposure condition calculation information, the exposure condition calculating means 101 obtains exposure conditions of the exposure means B. Then, based on the obtained exposure conditions, the image information correcting means 102 corrects the read image information thereby to produce exposure-conditioned image information. Based on the exposure-conditioned image information and image display calculation information, the display control means 103 produces display image information for causing the monitor device M to display, as color images, the density image and the reference image in juxtaposition to each other (not shown).

Accordingly, in viewing the density image and the color image corresponding to the reference image, the operator may judge appropriateness of the density. Then, if the density is inappropriate, its correction contents are inputted from the control panel F.

With this input from the control panel F, the image display calculation information is corrected. And, from this corrected image display calculation information, display image information is again produced. Then, a color image corresponding to this display image information, i.e. the corrected density image and the color image corresponding to the reference image are displayed on the monitor device M.

Accordingly, by viewing the color image displayed after the correction and corresponding to the density image and viewing also the color image corresponding to the reference image, the operator may more reliably judge the appropriateness of the correction with the further possibility of confirmation of how the correction influences the color image corresponding to the reference image. Needless to say, if a further correction is needed, an appropriate display condition may be obtained by inputting correction contents to the control panel F.

Next, some other embodiments of the present invention will be described.

(1) As the exposure means B, in addition to the projection exposure type described in the foregoing embodiment, a so-called digital type exposure means using e.g a PLZT printing head for printing the printing paper 3 may be used as well.

(2) In the foregoing embodiment, in the case of using the projection exposure type expore means as the exposure means B, the reader means A and the exposure means B are disposed with a distance therebetween in the film transporting direction. Instead, the reader means A and the exposure means B may be disposed adjacent to each other, with disposing the image sensor 15 of the reader means A so as to detect the transmission or reflected light of the light beam irradiated from the projection exposure light source 10 on to the film. Incidentally, in this case, after the film 2 is advanced to the terminal end for reading of its image information, the film 2 is moved backwards so that a starting end of the film may be located at the exposing position of the exposure means B and from this condition an exposure operation may be started.

(3) In the foregoing embodiment, the color chart image C and the reference image R are employed in combination. Instead, it is conceivable to emobody the invention without using the reference image. Further, in the case also of using these in combination, in place of providing the color correction film 21A and the auxiliary correction film 21B together as a single film, it is also conceivable to provide these color correction film 21A and the auxiliary correction film 21B as two separate films to be separately read by the reader means A.

(4) In the density correction, any other means such as that using a gray step may be used. Further, as described in the foregoing embodiment, in the case also of using the density correction film 22A recording the density image in the form of a circle corresponding to the standard density and the auaxiliary correction film 22B recording the reference image of a human subject, a landscape or the like, in place of providing these films as one film, these density correction film 22A and the auxiliary correction film 22B may be provided as separate films to be respectively read by the reader means A. Also, the shape of the density image to be recorded on the density correction film 22A is not limited to the circle shape.

(5) The monitor system for an image printer according to the present invention may be conveniently used when integrated with the image printer, as described in the foregoing embodiment. Instead, this system may be used as a film checking system to be installed separately.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A monitor adjusting system for an image printer operable to obtain an exposure condition based on image information picked up by an image sensor from a film and having monitor for displaying a simulated image of a finished photographic print produced by using the exposure condition, the system comprising:

a color calibration film including a color chart image having a plurality of separate areas having different colors from each other and a reference image comprised of a natural image of a photographic subject such as a human subject and a landscape subject;

image information correcting means for producing a simulated image of said color chart image and said reference image from image information read from said color calibration film;

display control means for transmitting said simulated image to said monitor; and a control panel for controlling said image information correcting means while viewing said simulated image of said color image and said reference image being displayed simultaneously on said monitor so as to obtain appropriate quality in said simulated image of said color chart image and said reference image displayed on said monitor.

2. A monitor adjusting system as claimed in claim 1, further comprising:

a density calibration film including a density image corresponding to a reference density and a reference image comprised of a natural image of a photographic subject such as a human subject and a landscape subject.

3. A monitor adjusting system as claimed in claim 2, wherein said color calibration film and said density calibration film are constructed as a single film.

4. A monitor adjusting system for an image printer operable to obtain an exposure condition based on image information picked up by an image sensor from a film and having a monitor for displaying a simulated image of a finished photographic print produced by using the exposure condition, the system comprising:

a color calibration film including a color chart image having a plurality of separate areas having different colors from each other and a reference image comprised of a natural image of a photographic subject such as a human subject and a landscape subject;

image information correcting means for producing a simulated image of said color chart image and said reference image from image information read from said color calibration film, and further producing actual information concerning the color to be corrected and correction content information;

display control means for simultaneously displaying on said monitor said simulated image of said color chart image and said reference image, said actual information and said correction content information; and a control panel for controlling said image information correcting means while viewing said simulated image being displayed on said monitor so as to obtain appropriate quality in said simulated image of said color chart image and said reference image displayed on said monitor.

* * * * *